United States Patent
Xu et al.

(10) Patent No.: US 11,928,620 B2
(45) Date of Patent: *Mar. 12, 2024

(54) METHOD FOR ESTIMATING AMOUNT OF TASK OBJECTS REQUIRED TO REACH TARGET COMPLETED TASKS

(71) Applicant: Clari Inc., Sunnyvale, CA (US)

(72) Inventors: Xin Xu, Sunnyvale, CA (US); Chunyue Du, Sunnyvale, CA (US); Xincheng Ma, Sunnyvale, CA (US); Kaiyue Wu, Sunnyvale, CA (US); Venkat Rangan, Sunnyvale, CA (US)

(73) Assignee: CLARI INC., Sunnyvale, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/569,779

(22) Filed: Jan. 6, 2022

(65) Prior Publication Data

US 2022/0129825 A1    Apr. 28, 2022

Related U.S. Application Data

(63) Continuation of application No. 16/163,546, filed on Oct. 17, 2018, now Pat. No. 11,250,357, which is a (Continued)

(51) Int. Cl.
*G06Q 10/0631* (2023.01)
*G06F 9/48* (2006.01)
(Continued)

(52) U.S. Cl.
CPC ..... *G06Q 10/063112* (2013.01); *G06F 9/485* (2013.01); *G06F 16/903* (2019.01);
(Continued)

(58) Field of Classification Search
CPC ........... G06Q 10/0633; G06Q 10/0635; G06Q 10/067
See application file for complete search history.

(56) References Cited

U.S. PATENT DOCUMENTS 5,953,707 A    9/1999 Huang et al.
7,480,623 B1    1/2009 Landvater
(Continued)

OTHER PUBLICATIONS

Chen et al., ("Gray Relation Analysis and Multilayer Functional Link network sales forecasting model for perishable food in convenience store", Expert Systems with Application 36 (2009)) (Year: 2009).

(Continued)

*Primary Examiner* — Lewis A Bullock, Jr.
*Assistant Examiner* — Kevin X Lu
(74) *Attorney, Agent, or Firm* — WOMBLE BOND DICKINSON (US) LLP

(57) ABSTRACT

In an embodiment, described herein is a system and method for creating a suggested task set to meet a target value. A cloud server, in response to receiving a request specifying a target value, retrieves completed task sets from a database. Each completed task set includes a same set of task categories. The cloud server derives a number of ratios from the retrieved completed task sets, including a composition ratio and a conversion rate for each task category, and an addition ratio for the number of completed task sets. Based on the derived ratios and the specified target value, the cloud server constructs the suggested task set, and displays in real-time the suggested task set together with current values for the task categories. The cloud server alerts users of a discrepancy between a current value and the corresponding suggested value for a task category when the discrepancy reaches a predetermined level.

19 Claims, 7 Drawing Sheets

Related U.S. Application Data continuation-in-part of application No. 15/882,993, filed on Jan. 29, 2018, now Pat. No. 10,846,643.

(51) Int. Cl.
| | |
|---|---|
| *G06F 16/903* | (2019.01) |
| *G06Q 10/0633* | (2023.01) |
| *G06Q 10/0637* | (2023.01) |
| *G06Q 10/0639* | (2023.01) |
| *G06N 7/01* | (2023.01) |

(52) U.S. Cl.
CPC . *G06Q 10/063118* (2013.01); *G06Q 10/0633* (2013.01); *G06Q 10/0637* (2013.01); *G06Q 10/06375* (2013.01); *G06Q 10/0639* (2013.01); *G06N 7/01* (2023.01)

(56) References Cited

U.S. PATENT DOCUMENTS

| | | | |
|---|---|---|---|
| 8,417,715 | B1 | 4/2013 | Bruckhaus et al. |
| 10,255,085 | B1 | 4/2019 | Valsaraj et al. |
| 10,607,252 | B2* | 3/2020 | Allouche .......... G06Q 10/0639 |
| 10,861,027 | B1 | 12/2020 | Barton et al. |
| 2003/0068097 | A1 | 4/2003 | Wilson et al. |
| 2003/0182250 | A1 | 9/2003 | Shihidehpour et al. |
| 2009/0138301 | A1 | 5/2009 | Wan |
| 2009/0216571 | A1 | 8/2009 | Sunshine et al. |
| 2013/0339089 | A1* | 12/2013 | Olsen .............. G06Q 10/06375 705/7.31 |
| 2014/0304034 | A1 | 10/2014 | Mitchell et al. |
| 2016/0150280 | A1 | 5/2016 | Cui et al. |
| 2016/0155137 | A1 | 6/2016 | Harsha et al. |
| 2017/0237859 | A1 | 8/2017 | Hedges |
| 2017/0286978 | A1 | 10/2017 | Govindarajan et al. |
| 2018/0005171 | A1 | 1/2018 | Harsha et al. |
| 2018/0005253 | A1* | 1/2018 | Megahed ............. G06Q 10/067 |
| 2018/0060830 | A1* | 3/2018 | Abramovici ....... G06Q 10/1097 |
| 2020/0104765 | A1 | 4/2020 | Desai et al. |

OTHER PUBLICATIONS

Yinen et al., ("Measuing Forecast Accuracy: The Complete Guide", www.relexsolutions.com/measuring-forecast-accuracy/, Nov. p, 2017). (Year: 2017).

Unknown Author, "Sales analytics sales rep overview Dashboard", help.salesforce.com/apex/HTViewHelpDoc?id=bi_app_sales_analytics_dashboard_rep_overview.htm, Jan. 2018 (Year: 2018).

Unknown Author, "5 Salesforce Dashboards to Hold Sales Reps Accountable", galvintech.com/5-salesforce-dashboards-to-hold-sales-reps-accountable/, Apr. 2017 (Year: 2017).

Kapoor, S. G., et al, "Modeling and Forecasting Sales Data by Time Series Analysis," Journal of Marketing Research, vol. 18, No. 1, Feb. 1981, pp. 94-100.

Agrawal, D., Schorling, C., Market share forecasting: An empirical comparison of artificial neural networks and multinomial logit model, Journal of Retailing, 72(4), pp. 383-407, ISSN: 0022-4359, Winter 1996.

Hochreiter, S. et al., Long Short-Term Memory. Neural Computation, 9(8):1735-1780, 1997.

Booth, E. et al., Hydrologic Variability of the Cosumnes River Floodplain. San Francisco Estuary & Watershed Science. vol. 4, Issue 2, Article 2, Sep. 2006.

Hastie, T. et al., The elements of statistical learning: Data mining, inference, and prediction, Stanford, CA: Springer, 2008.

Duncan, B., Elkan, C. Probabilistic modeling of a sales funnel to prioritize leads, Department of Computer Science and Engineering, University of California, CA, pp. 1751-1758. < http://dx.doi.org/10.1145/2783258.2788578>, Aug. 10-13, 2015.

Dalkey, N., Helmer, O., An experimental application of the delphi method to the use of experts. United States Air Force under Project RAND, Contract No. AF 49(638)-700, Apr. 1, 1963.

Unknown Author, R-Isotonic Monotone Regression, 2003 (Year: 2003).

* cited by examiner

| Task Categories | Beginning of Future Quarter (Q)<br>Specified Target Value (T) = 50<br><br>Total Realized Value (R) =<br>T / (1 + Average Addition Ratio) =<br>50 / [1 + (45.4% + 62.5%)/2] = 32.46 | Average Composition Ratio (Comp$_{avg}$) | Average Conversion Rate (Conv$_{avg}$) | Q-1 | Q-2 |
|---|---|---|---|---|---|
| Closed | 15.48 ← 15.48<br>(R * Comp$_{avg}$) / Conv$_{avg}$ = (32.46 * 47.7%) / 100% = 15.48 | 47.7% | 100% | 10 → 10<br>Conv = 100%<br>Comp = 45.5% | 12 → 12<br>Conv = 100%<br>Comp = 50% |
| Commit | 15.47 ← 11.99<br>(R * Comp$_{avg}$) / Conv$_{avg}$ = (32.46 * 36.95%) / 77.5% = 11.99 | 36.95% | 77.5% | 12 → 9<br>Conv = 75%<br>Comp = 40.9% | 10 → 8<br>Conv = 80%<br>Comp = 33% |
| Pipeline | 21.85 ← 4.91<br>(R * Comp$_{avg}$) / Conv$_{avg}$ = (32.46 * 15.15%) / 22.5% = 4.91 | 15.15% | 22.5% | 15 → 3<br>Conv = 20%<br>Comp = 13.6% | 16 → 4<br>Conv = 25%<br>Comp = 16.7% |
| New Tasks | 17.52 | N/A | N/A | 10<br>Addition = 45.4% | 15<br>Addition = 62.5% |
| Total Tasks | 50 | N/A | N/A | 32 | 39 |

FIG. 3

METHOD FOR ESTIMATING AMOUNT OF TASK OBJECTS REQUIRED TO REACH TARGET COMPLETED TASKS

RELATED APPLICATIONS

This application is a continuation of U.S. patent application Ser. No. 16/163,546, filed Oct. 17, 2018, which is a continuation-in-part (CIP) of U.S. patent application Ser. No. 15/882,993, filed Jan. 29, 2018, and issued as patent Ser. No. 10/846,643 on Nov. 24, 2020. The aforementioned applications are herein incorporated by reference in their entireties.

FIELD OF THE INVENTION

Embodiments of the present invention relate generally to cloud servers and data processing systems. More particularly, embodiments of the invention relate to a visualization system for real-time monitoring of a suggested task set created to meet a specified task value.

BACKGROUND

Resource allocation is critical for completing tasks in time in any organization. Given a target number for a particular period of time, project managers need to allocate sufficient resources for achieving the target number in time. For example, when people make plans for a future quarter, they often need to determine how much effort to make before the deadline, such that when the deadline does arrive, they have sufficient resources in pipelines to meet their goal.

Currently, people often rely on rough estimates according to their experience. However, a more desirable approach would be to allocate required resources at the beginning of the particular period of time based on historical data, and to use quantitative methods, together with a real-time visualization system, to provide additional guide for them to prepare for the subsequent periods.

BRIEF DESCRIPTION OF THE DRAWINGS

Embodiments of the invention are illustrated by way of example and not limited to the figures of the accompanying drawings in which like references indicate similar elements.

FIG. 3 illustrates a table showing example historical task data that can be used to construct a suggested task set in accordance with an embodiment of the invention.

DETAILED DESCRIPTION

Figure 1:
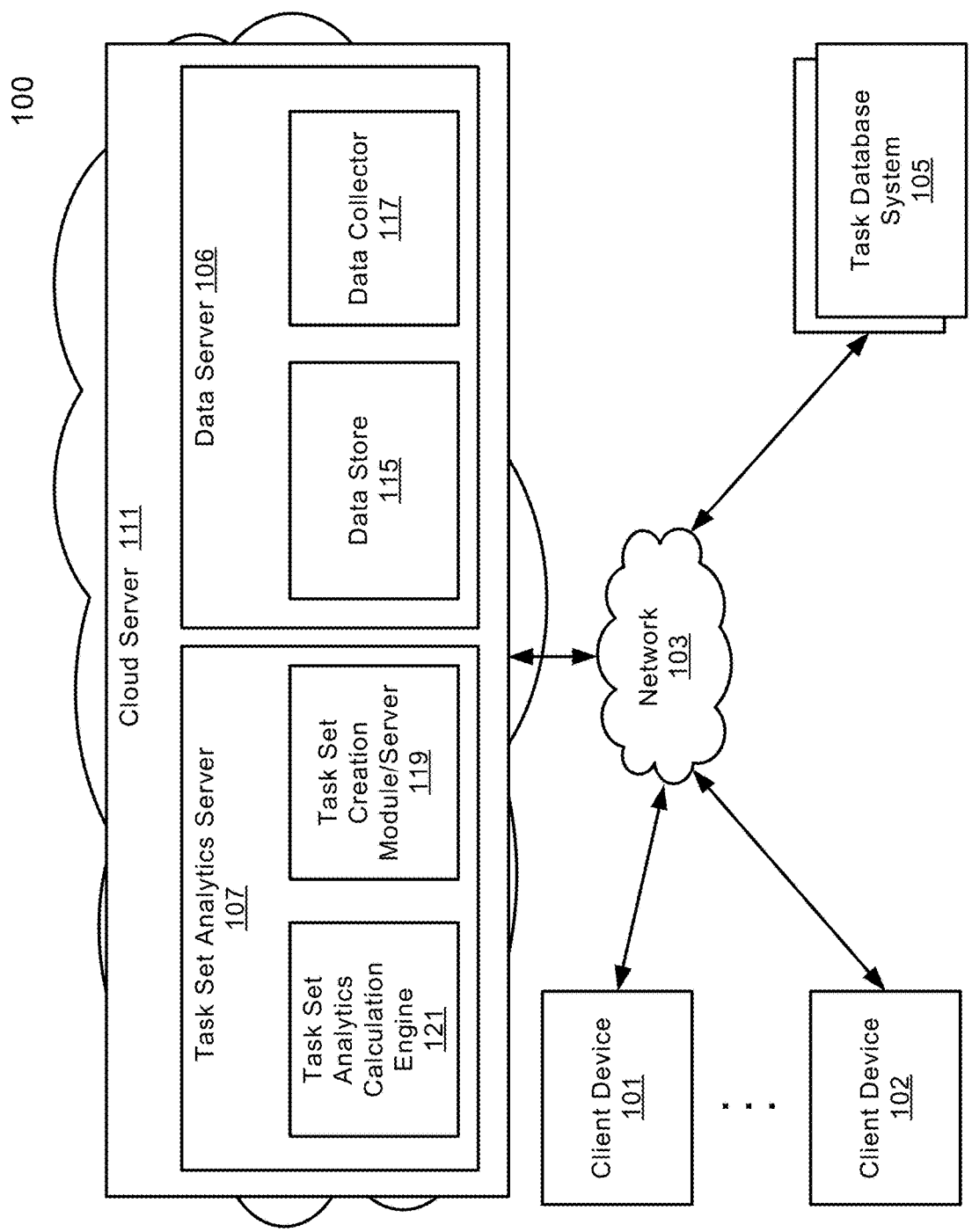
FIG. 1 is a block diagram illustrating a network configuration according to one embodiment of the invention.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one embodiment, described herein is a system and method for creating a suggested task set to meet a target value. A cloud server, in response to receiving a request specifying a target value, retrieves completed task sets from a database. Each completed task set includes a same set of task categories. The cloud server derives a number of ratios from the retrieved completed task sets. Based on the derived ratios and the specified target value, the cloud server constructs the suggested task set, and displays in real-time the suggested task set together with current values for the task categories. The cloud server alerts users of a discrepancy between a current value and the corresponding suggested value for a task category when the discrepancy reaches a predetermined level.

In an embodiment, the cloud server is communicatively coupled to a task database system, and can receive a request for creating a task set for a beginning of a particular time period. In response to the request, the cloud server can retrieve, via an application programming interface (API) using a database query protocol, completed task sets from the task database system. Each completed task set includes the same set of task categories, and each task category represents a different stage of progression in the life cycle of a task.

In an embodiment, the derived ratios can include a composition ratio, a conversion rate, and an addition ratio. Each of the derived ratios is an average ratio for the completed task sets. The composition ratio is for each task category and represents a percentage of that task category in a completed task set. The conversion rate represents the possibility that the nominal value of a task category in a task set can be converted into a realized value. The addition ratio represents a ratio at which a total realized value of a completed task set increases over time.

In an embodiment, when deriving the addition ratio from historical data, the cloud server first determines the realized value for a completed task set (e.g., a closed revenue for a pipeline) on a particular day, and then determines how much addition value actually come in after the particular date. As such, the addition ratio can be used to estimate the potential revenues or potential deals that a team/organization can create after a particular date for a particular period of time.

In an embodiment, based on the addition value and the specified target value, the cloud server can determine a total realized value for the suggested task set.

In an embodiment, the cloud server subsequently can construct the suggested task set with the task categories, with each task category having a suggested nominal value that would generate a realized value matching the corresponding composition ratio of that task category.

In an embodiment, each of the completed task sets was constructed and completed in one of a number of predetermined time periods, and each predetermined time periods matches the particular time period in length.

In an embodiment, a graphical user interface can be used to display breakdowns of the suggested task set by task categories, along with breakdowns of projected realized values of those task categories in a number of days before the beginning of a future time period, for which the suggested task has been created. For a task category with a projected realized value below a corresponding value in the suggested task set by a predetermined amount, the graphical user interface can display the projected realized value in a different color or otherwise differently from projected realized values for other task categories, so that users responsible for the suggested task set can allocate additional resources (e.g., deals/revenues/opportunities) to the task category.

In one particular use case, embodiments of the invention can provide guidance on how much revenue a sales leader or salesperson need to accumulate in their pipeline before the first day of the next quarter in order to achieve their quota. Moreover, embodiments of the invention can use granularized breakdowns for the total suggested revenue to provide further insights on to which extent those pipeline deals should progress by a particular time. As such, systems and methods described herein can be useful in efficient allocation of workforce to work on a future quarter before it arrives, to avoid surprising amount of work within the quarter. Although various embodiments of the invention are implemented in a cloud server environment in this disclosure, they can be similarly implemented in an on-premises environment.

Cloud Server

FIG. 1 is a block diagram illustrating a network configuration according to one embodiment of the invention. Referring to FIG. 1, system 100 includes one or more clients 101-102 communicatively coupled to a cloud server 111 and a task database system 105 over network 103. The cloud server 111 can further include a data server 106, and a task set analytics server 107.

Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless.

In one embodiment, the task database system 105 can be a customer relationship management (CRM) system that store historical data and/or raw opportunity. The task database system 105 provides task data services and data to a variety of clients, which may be periodically or constantly accessed and updated by the clients for managing their task management data.

The data server 106 and the task set analytics server 107 can be any kinds of servers, for example, Web servers, application servers, cloud servers, backend servers, etc. The data server 106 can include a data store 115 and a data collector 117. The data collector 117 can connect using a variety of communication protocols to the task database system 105, and can be periodically updated from the task database system 105 or another data source or data provider. The data server 106 can perform Extract, Transform and Load (ETL) operations, and save the preprocessed data into a data store 115, and can allow the task set analytics calculation engine 121 to dynamically access task data in a ready-to-use fashion through the data collector 117. Data stored in the data store 115 can be maintained in a variety of data structures, such as tables or databases.

In an embodiment, the cloud platform server 111 can be provided between client devices 101-102 and the task database system 105. Users at client devices 101-102 can log in to the cloud server 111, which can utilize services and data provided by the task database server 105. As such, the cloud server 111 operates to add a layer of intelligence to the task database system 105. The cloud server 111 provides a number of predictive algorithms based on AI and machine learning technologies, for use in identifying risks and delivering predictive insights using data gathered from a number of sources.

For example, the cloud server 111 can provide users with insights into which tasks are most likely to complete and which tasks are at the highest risk of slipping, to enable the users to focus their resources on the right tasks. The cloud server 111 can provide the above-mentioned insights by analyzing all tasks over a predetermined period of time in the past, e.g., over the past two years, and use a model (e.g., hidden Markov model) and one or more AI classification algorithms to identify patterns and factors that drive those tasks that were successfully completed and those tasks that failed to complete.

The cloud server 111 can perform a number of additional functions using modules/servers executing in the cloud server 1111. As shown in FIG. 1, the cloud server 111 can use the task set analytics server 107 to prepare corresponding historical data for use by the task set creation/server 119. The task set analytics engine can prepare/calculate final results in a real-time fashion.

The task set creation module 119 can be used to construct a proposed task set (e.g., a pipeline) needed at the beginning of a future time period, in order to hit a quota for the end of the future time period. The module can analyze patterns of open tasks at the beginning of past quarters, and can predict the composition of the proposed pipeline needed to hit the quota based on historical data.

Suggested Task Set

Figure 2:
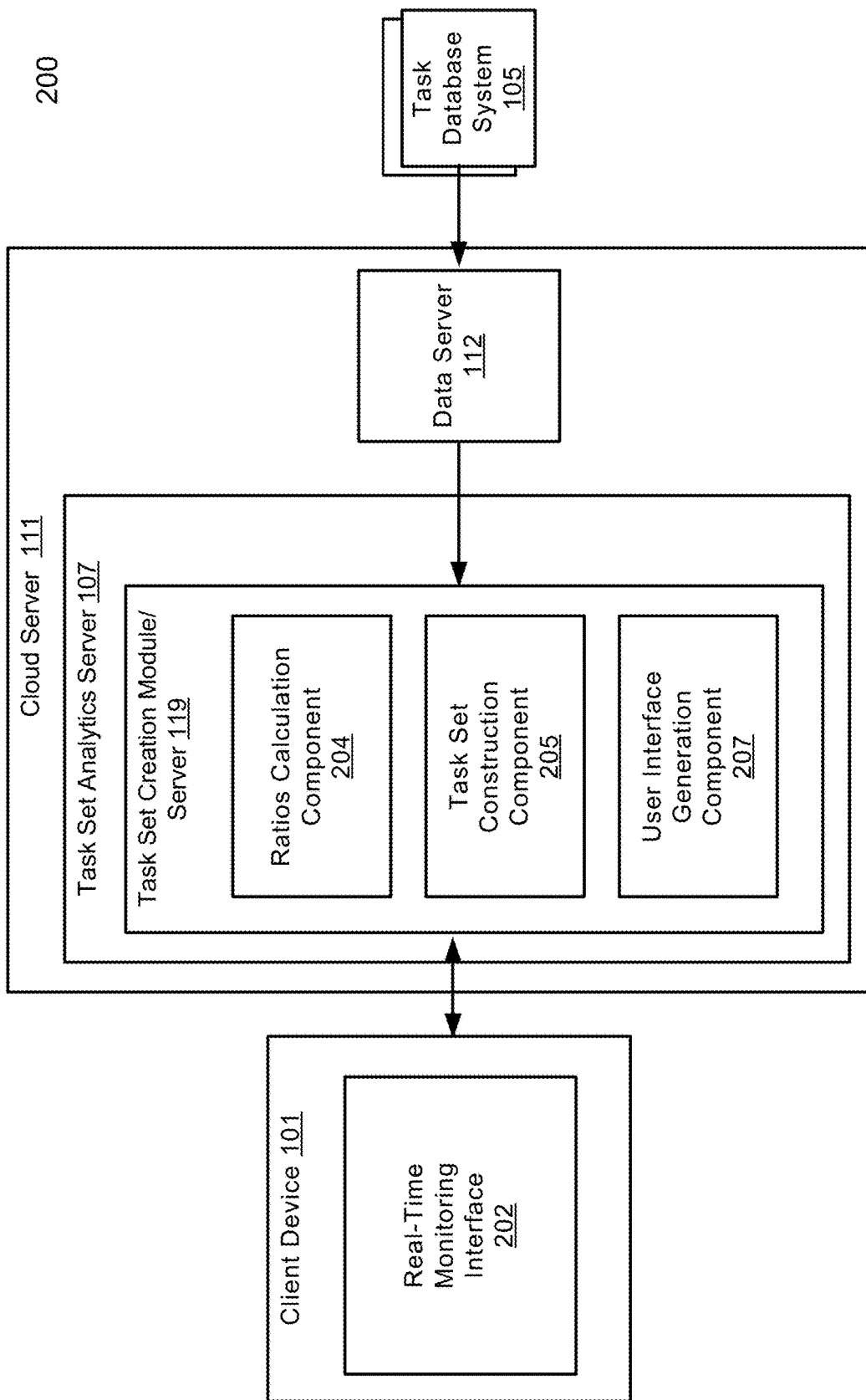
FIG. 2 illustrates a system for constructing a suggest task set, in accordance with an embodiment of the invention.

FIG. 2 illustrates a system for constructing a suggest task set, in accordance with an embodiment of the invention. As shown in FIG. 2, the task set creation module 119 can include components 203-207, each of which can perform one or more functions in creating the suggested task set.

The cloud server 111 can receive a request from the client device 101, for creating a suggested task set at a beginning of a particular future time period, for example, the first day of next quarter. The request also needs to specify a target value for the end of the particular future time period, for example, the last day of the quarter. The specified target value is the value that the suggested task set needs to achieve by the end of the particular future period.

In an embodiment, the suggested task set can be a pipeline with different categories of tasks. Each category of tasks can be in a different stage of procession in a life cycle of a task, and as such, can include one or more attributes and categories that other task categories do not have.

In response to receiving the request, the data server 112 can invoke an application programming interface (API) using a database query protocol to retrieve a number of completed task sets from the task database system 105. Each completed task set includes the same set of task categories, and each task category represents a different stage of progression in the life cycle of a task.

In an embodiment, each of the completed task sets is completed within a given period of time. For example, the first completed task set is started or constructed on the first day of the first quarter of a particular year and completed on the last day of the first quarter of the particular year, whereas a second completed task set is started or constructed on the first day of the second quarter of the particular year, and completed on the last day of the second quarter of the particular year.

In an embodiment, each completed task set can be a pipeline with existing tasks (pending tasks) and new tasks to be added to the pipeline. Therefore, the total number of tasks to be completed for a task set within a given time period includes: 1) tasks in pipeline $T_{pipeline}$; and 2) new tasks $T_{new}$ that have yet to be added. In one embodiment, each task is associated with a task value or task size representing the value of the task. Each task in a task set/pipeline can have a conversion/realization rate. With the realization rate of each task associated with a task set, the total realization value of the task set can be determined. In an embodiment, each task in a pipeline can have a nominal/pipeline value, which, for example, can represent a value assigned by an organization. In an embodiment, the data server 106 can save the preprocessed data, for use by the task set creation server 119 to create a suggested task set.

Ratios calculation component 204 can be configured to calculate a number of ratios from the retrieved completed task sets. In an embodiment, the calculated ratios can include a composition ratio for each of plurality of task categories and an addition ratio for the completed tasks. The composition ratio is for each task category and represents a percentage of that task category in a completed task set. The conversion rate represents the possibility that the nominal value of a task category in a task set can be converted into a realized value. The addition ratio represents a ratio at which a total realized value of a completed task set increases over time.

In an embodiment, task set construction component 205 can determine a total realized value for the suggested task set based on the specified target value and the addition ratio. Using the total realized value for the suggested task set, the conversion rate and composition ratio for each task category, the task set construction component 505 can construct the suggested task set, with each task category associated with a suggested pipeline/nominal value that would be realized into a value matching the corresponding conversion rate for that task category.

In an embodiment, each of the completed task sets was constructed and completed in one of a number of predetermined time periods, and each predetermined time periods matches the particular time period in length. The task categories in the suggested task set and in each completed task set represent different stages of procession in a life cycle of a task. For example, when a user tracks the progress of a task using "forecast category", the task categories may include "closed", "commit", "upside/Best Case", "pipeline", "not included", and "new".

User interface generation component 207 can generate a real-time monitoring interface 202 in the client device 101, and displays the suggested task set and the suggested task categories in the graphical user interface at a client device.

In an embodiment, the real-time monitoring interface can graphically display breakdowns of task categories of the suggested task set, and a current value for each task category in one or more dates before the beginning of the particular future time period, for which the suggested task set has been created. If a current value for a particular task category is below the suggested value for the task category by a predetermined amount, the current value can be shown in a different color or otherwise differently from current values for other task categories, so that users responsible for the suggested task set can allocate additional resources (e.g., deals/revenues/opportunities) to the task category.

FIG. 3 illustrates a table showing example historical task data that can be used to construct a suggested task set in accordance with an embodiment of the invention. Referring to FIG. 3, the table includes a number of rows. Each row corresponds to one task category, in this example, "closed," "commit," and "pipeline." These task categories are provided as examples; other task categories can be used. The column "Beginning of Future Quarter (Q)" column shows the values of tasks in each task category in the suggested task set for a future quarter.

Q-1 and Q-2 columns list example completed task sets in the two past quarters. Additional completed task sets from the two quarters can also be used. Data for the completed task sets shown in the Q-1 and Q-2 columns are retrieved from the task database system. Each completed task set includes the same set of task categories.

In an embodiment, for each task category in each completed task set, the cloud server can calculate a conversion rate. For example, for the completed task set shown in the column Q-1, the conversion rates for the task categories "Closed", "Commit", and "Pipeline" are respectively 100%, 75%, and 20%. The conversion rate for each task category represents a ratio of a realized value at the end of the quarter and a nominal value at the beginning of the quarter. As an illustrative example, for the task category "Closed", the conversion rate is 10/10=100%, which indicates all tasks in this task categories have been successfully closed.

As another example, for the task category "Pipeline", the conversion rate is 3/15=20%, which indicates tasks in this task category has a much lower possibility of being successfully closed. Similarly, for each task category in each completed task set, the cloud server can calculate a composition ratio. For example, for the completed task set shown in the column Q-1, the composition ratios for the task categories "Closed", "Commit", and "Pipeline" are respectively 45.4%, 40.9%, and 13.6%. The composition ratio for each task category represents a ratio of a realized value of the task category of a task set and a total realized value of the task set. For example, for the task category "Closed", the composition ratio is 10/(10+9+3)=45.5%.

Each task set in the table also includes new tasks that are added as the quarter progresses. For example, for the Q-1 column, a realized value of 10 from one or more new tasks has been added to the task set by the end of the quarter, representing an addition ratio of 45.4%. The addition ratio of 45.4% is a rate that the total realized value of the task set increases from the beginning of the quarter to the end of the quarter. For this particular task set shown in the Q-1 column, the total realized value from the task set at the beginning of the quarter is 10+9+3=22, and the total realized value at the end of the quarter is 32. Therefore the addition ratio is 10/22=45.2%.

Based on the composition ratio and conversion rate for each task category in the past quarters, an average composition ratio and an average conversion rate over the past two quarters can be computed. For example, for the task category "Closed", the average composition ratio over the past two quarters is (45.5%+50%)/2=47.7%, and the average conversion rate over the two past quarters is (100%+100%)/2=100%.

As further shown in the table in FIG. 3, a target value of 50 for the suggested task set at the end of the future quarter can be specified by a request received at the cloud server for constructing the suggested task set for the beginning of the future time period. With the specified target value and the various ratios and rates previously calculated, the cloud server can contrast the suggest task set.

Based on the target value specified for the end of the future quarter and the average addition ratio over the past two quarters (i.e., (45.5%+62.5%)/2=54%), the cloud server can estimate a total realized value that the suggested task set needs to have in order to achieve the specified target value in view of the average addition ratio.

For example, as shown at the top row of the "Beginning of Future Quarter (Q)", the total realized value (R) is estimated to be 32.46 using the formula R=Target Value/(1+Average Addition Ratio.

With the total realized value (i.e., expected closed values) of the suggested task set at the beginning of the future quarter and an average composition ratio and conversion rate for each task category over the past two quarters, the nominal value for each task category in the suggested task set can be determined.

For example, for the task category "Commit", since the average composition ratio over the past two quarters is 47.7%, the expected closed value/realized value from one or more tasks in this task category would be calculated using the formula Total Realized Value (R)*Average Composition Ratio=32.46*47.7%=9.51. Based on the expected realized value for the task category and the average conversion rate for this task category, a nominal value for this task category can be determined by dividing the expected realized value with the average conversion ratio. For example, for the task category "Commit" in the suggested task set, the expected closed/realized value for the task category is 11.99, which can be translated a nominal value of 15.47 based on the average conversion rate for the task category. Similarly, nominal values for other task categories in the suggested task set can be determined.

In accordance with an alternative embodiment, the nominal values for each task category in the suggested task set can be calculated without using the average conversion rate from the past quarters. In this embodiment, for the completed task sets from the past quarters, the cloud server can gather nominal values for each task category from the beginnings of the past quarter and realized values for that task category from the ends of the past quarters. Based on the total nominal value and the total realized value for each task category in the past quarters, and the total expected realized value for the suggested task set, the nominal value for each task category in the suggested task set can be computed without using an average conversion rate for each task category from the past quarters. The alternative embodiment uses the same raw data from the past, and provides a mathematic shortcut for calculating nominal values (i.e., pipeline values) for the task categories in the suggested task set.

As an illustrative example for the alternative embodiment, the nominal value for the task category "Commit" can be calculated as follows:

Operation 1: Calculating a total realized value of the suggested task set (i.e., 32.46).

Operation 2: Calculating a total nominal/pipeline value for the task category from the past quarters (i.e., 12+10=22).

Operation 3: Calculating a total realized value for the task category from the past quarters (i.e., 9+8=17).

Operation 4: Calculating an average composition rate for the task category (i.e., 36.95%).

Operation 5: Calculating the nominal value of the task category in the suggested task set (i.e., (32.46/17)*22*36.95%=15.47).

An Exemplary Implementation

The exemplary implantation shown below is provided for the purpose of illustration. It would be appreciated that other implementations of various embodiments of the invention can be used without limitation.

In the exemplary implementation, methods for constructing a suggested task set (e.g., a pipeline) are illustrated. The methods can be generalized to calculate nominal values (i.e., pipeline values) for task categories in the suggested pipeline for any target date given the quota/target on any successive end date within a given quarter.

In this implementation, a suggested pipeline for a target (i.e., beginning) date $t_{0i}$ is calculated in order to achieve the quota Q for an end date $t_{0j}$, the algorithms to obtain the results are as illustrated as follows:

Operation 1: Calculating the expected closed/realized value for the suggested task set by applying the addition ratio $\alpha_{ij}^0$ between day $t_{0i}$ and day $t_{0j}$:

Expected Closed Value $X=Q/(1+\alpha_{ij}^0)$, here $\alpha_{ij}^0=1/k\Sigma_k \alpha_{ij}^k$ In the above formula, k is the k-th past quarter, and $\alpha_{ij}^0$ is a computed average ratio from the same times in the past quarters.

Operation 2: After step 1, there can be two methods to calculate the task categories in the suggest task set.

Method 1: The expected closed value X calculated above can be broken into different task categories (e.g., forecast categories or FC). A typical composition of the expected close value X at the same times from the past quarters can be examined, and the typical composition represented by a percentage for a particular task category can be applied to the expected closed value to get the expected value for each task category in the suggested task set. A smoothing mechanism can be used to get a more reliable and stable result. Under the smoothing mechanism, the same times in the last quarters and surrounding days of the same times are examined. Assume that the corresponding time for the k-th quarter for $t_{0i}$ is $t_{ki}$, and that the corresponding percentage of a closed value for a particular task category (e.g., $FC_1$) is $p_{kj}^1$, the days surrounding $t_{ki}$ (e.g., $t_k, \ldots, $ i-m, $t_k, \ldots,$ i-1, $t_{k,i}, t_{k, i+1}, \ldots, t_{k, i+m}$) can be examined. The actual percentage used can be calculated by $p^1=1/(2M+1)\Sigma_{m=-M, \ldots, M} p_{k, i+m}^1$ The expected closed value for the task category ($FC_1$) can be calculated as $X^1=p^1*X$. From the expected closed value for the task category and an average conversion rate for the task category over the smoothing dates), the pipeline value (i.e., nominal value) of the task category in the suggested task set can be determined by $X^1/r^1$, where $r^1$ is $1/(2M+1)\Sigma_{m=-M, \ldots, M} r_{k, i+m}^1$, where $r_{k, i+m}^1$ is the conversion rate for $FC_1$ at the same times (include surrounding dates) in past quarters.

Method 2: Method 1 requires the retrieval of information for computing conversion rates for the task categories in the completed task sets in the past quarters. Method 2 uses a mathematical short to achieve similar results as Method 1. In Method 2, nominal/pipeline values and actual closed/realized values for each task category 1 can be gathered for the same times (e.g., particular dates) in the past quarters and the surrounding days of the same times. The pipeline values can be expressed by $P^l_{k, i-M}, \ldots, P^l_{k, i-1}, P^l_{k, i}, P^l_{k, \ldots, i+1}, P^l_{k, i+M}$, or k=1,2, . . . . The actual closed/realized values can be expressed by $C^l_{k, i-M}, \ldots, C^l_{k, i-1}, C^l_{k, i}, C^l_{k, i+1}, C^l_{k, i+M}$, for k=1,2, . . .

Therefore, the total pipeline value for the task category l ($FC_1$) can be calculated by $$P^l = \Sigma_k \Sigma_{m=1, \ldots, M} P^l_{k, i+m}$$

The total closed value for $FC_1$ can be calculated by $$C^l = \Sigma_k \Sigma_{m=1, \ldots, M} C^l_{k, i+m}$$

Assume that the suggested task set include L task categories, the nominal/pipeline value for the task category in the suggested task set can be calculated by $$X/(\Sigma_{i=1, \ldots, L} C^l) * \Sigma_{i=1, \ldots, L} P^l$$

To illustrate further, using Method 2, a total nominal value (N) and a total closed value (C) for each task category can be computed from a number of retrieved computed task sets. With the total closed/realized value for the suggested task set and a corresponding composition ratio (Y) for the task category, the pipeline/nominal value for the task category in the suggested pipeline can be obtained by (X/C)*N*Y.

Figure 4:
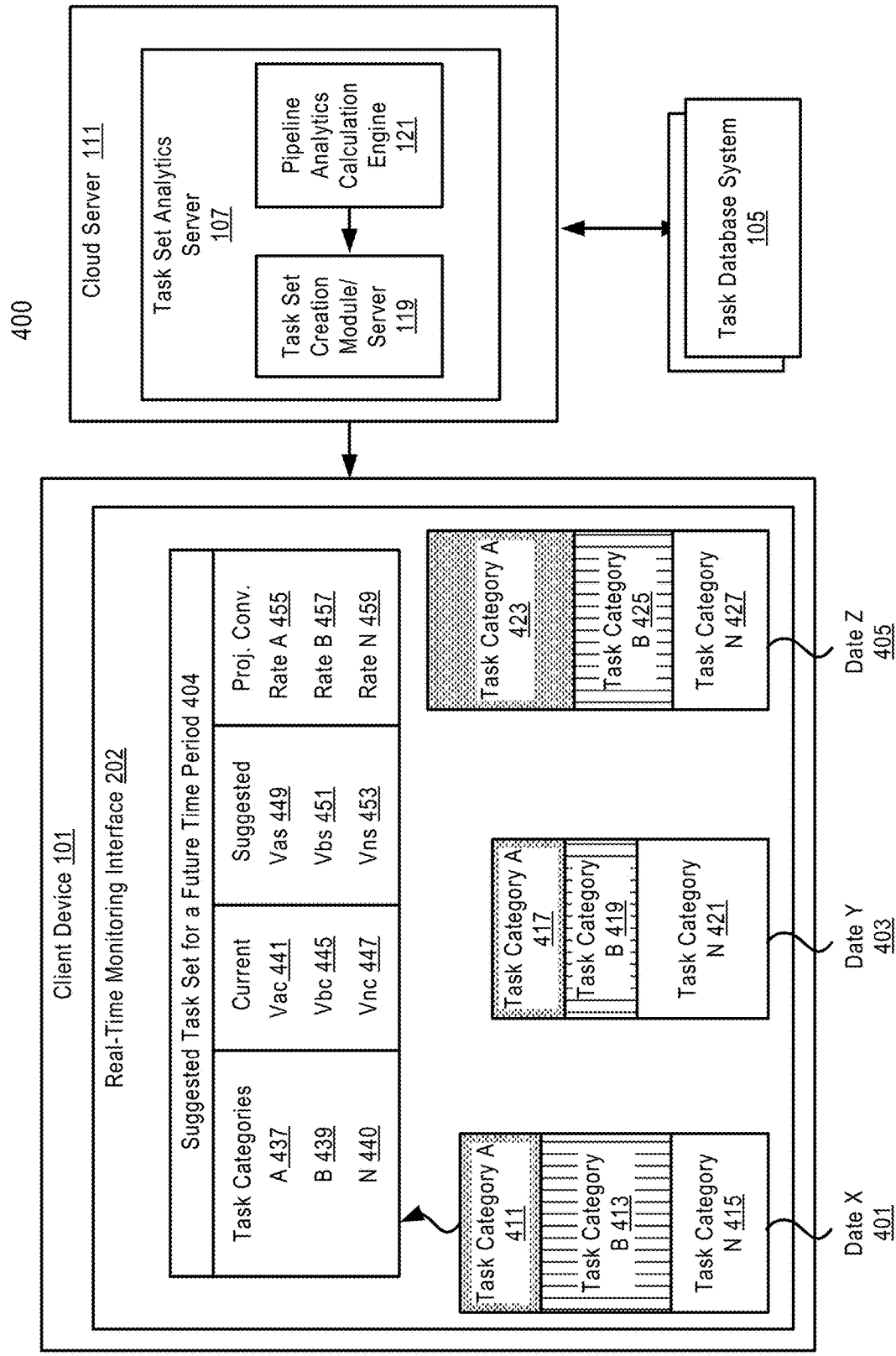
FIG. 4 further illustrates the real-time monitoring interface in accordance with an embodiment of the invention.

FIG. 4 further illustrates the real-time monitoring interface in accordance with an embodiment of the invention. As shown in FIG. 4, the real-time monitoring interface 202 can be generated by the task creation server 119, and can display a suggested task set for a future time period. The real-time monitoring interface can graphically display values of task categories in the suggested task set on a number of dates (e.g., date X 401, date Y 404, and date 405) before the beginning of the future time period.

For example, for each of date X 401, date Y 403, and date 405 Z, a bar chart can be displayed with task category A 411, 417, or 423; task category B 413, 419, or 425; and task category N 415, 421, or 427. The height of each bar chart on a particular date represents a projected realized value based on existing opportunities on the particular date. For example, a higher realized value can be expected on date Z than on date Y.

FIG. 4 also shows detailed breakdowns of the suggested task set and detailed breakdowns of task categories on each date at the selection of a user. For example, when a user clicks on the bar chart for the date X 401, a popup window 404 can be generated to display projected realized values 441, 445, and 447 on date X 401 for different task categories 437, 439, and 440 and the corresponding values 449, 451, and 453 in the suggested task. Project conversion rates 455, 457 and 459 can also be displayed in the popup window 404.

In accordance with an embodiment, if the projected realized value for a particular task category on a particular date is below the suggested value for the task category by a predetermined amount, the projected realized value would be shown in a different color or otherwise differently from projected realized values for other task categories, so that users responsible for the suggested task set can allocate additional resources (e.g., deals/revenues/opportunities) to the task category.

Figure 5:
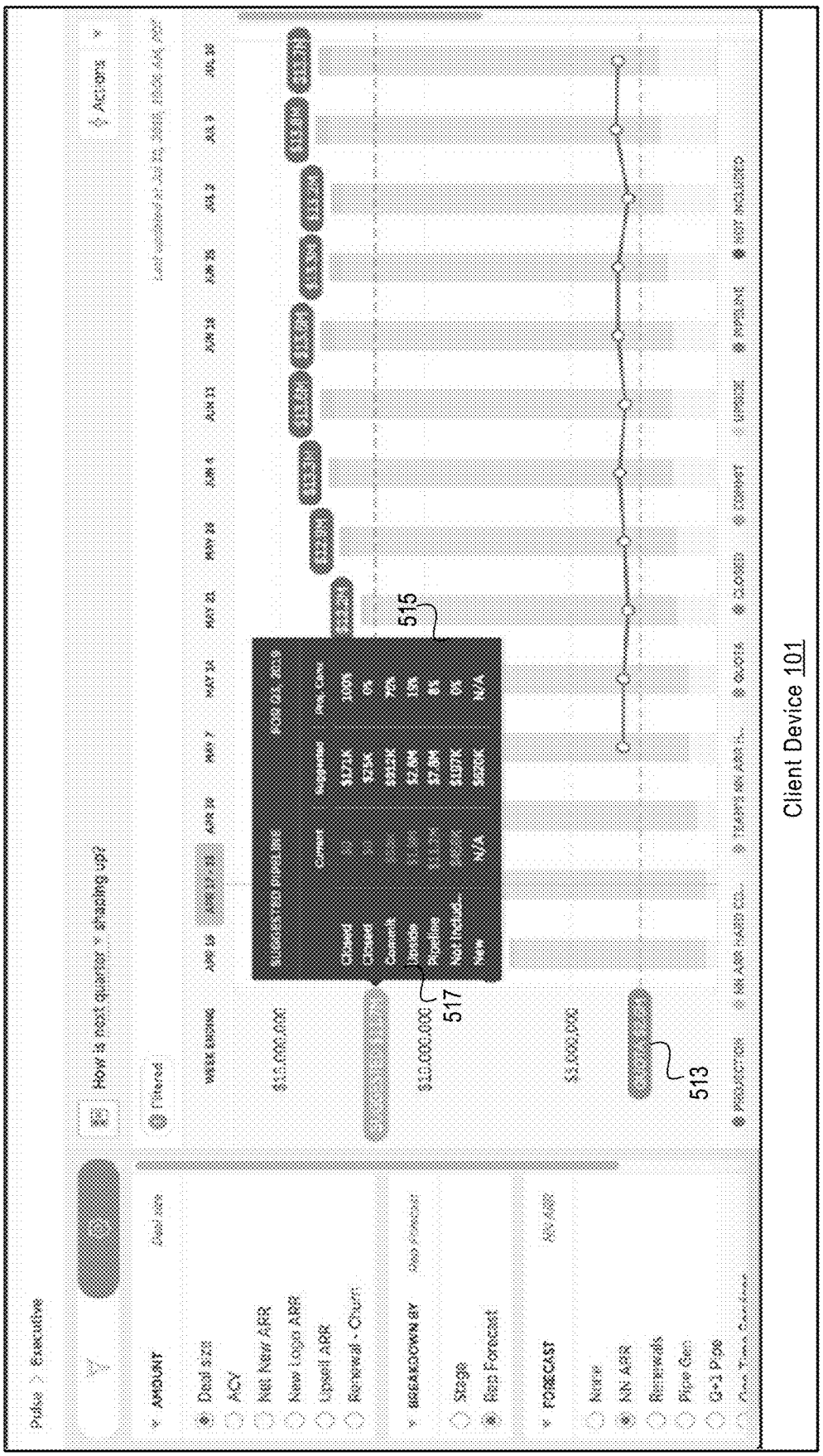
FIG. 5 further illustrates the real-time monitoring interface in accordance with an embodiment of the invention.

FIG. 5 further illustrates the real-time monitoring interface in accordance with an embodiment of the invention. As shown in FIG. 5, breakdowns by task categories of the suggested task set can be displayed in real-time in a graphical user interface in client device 101.

In the figure, a corresponding suggested pipeline 515 on the first day of the next quarter is shown with detailed breakdowns to meet a target value/quota of $2.6M 513 for the next quarter. Current projected realized values for the task categories and their corresponding conversion rates derived from historical data are also shown in the figure. The task category 517 is shown in a different color, since it is below the suggested value for the task category by a predetermined amount.

Additional measures can also be used to monitor the accuracy of the suggested pipeline analytics. For example, in a test quarter whose next quarter has already ended, pipeline analytics results on each day in the test quarter can be collected. The total suggested pipeline value on each day in the test quarter can be compared with the actual pipeline value on the first day of the next quarter. An average error can be calculated using the following metrics:

$$\text{error}_1 = 1/n \left( \sum_i \frac{(\text{Prediction on day } i - \text{Actual first day})}{\text{Actual first day revenue}} \right)$$

Further, besides iterating through all the dates in the test quarter, the cloud server also iterate through all the target dates in the next quarter. The cloud server can provide a suggested pipeline for each day of next quarter, instead of providing a suggested pipeline for the first day of the next quarter.

Figure 6:
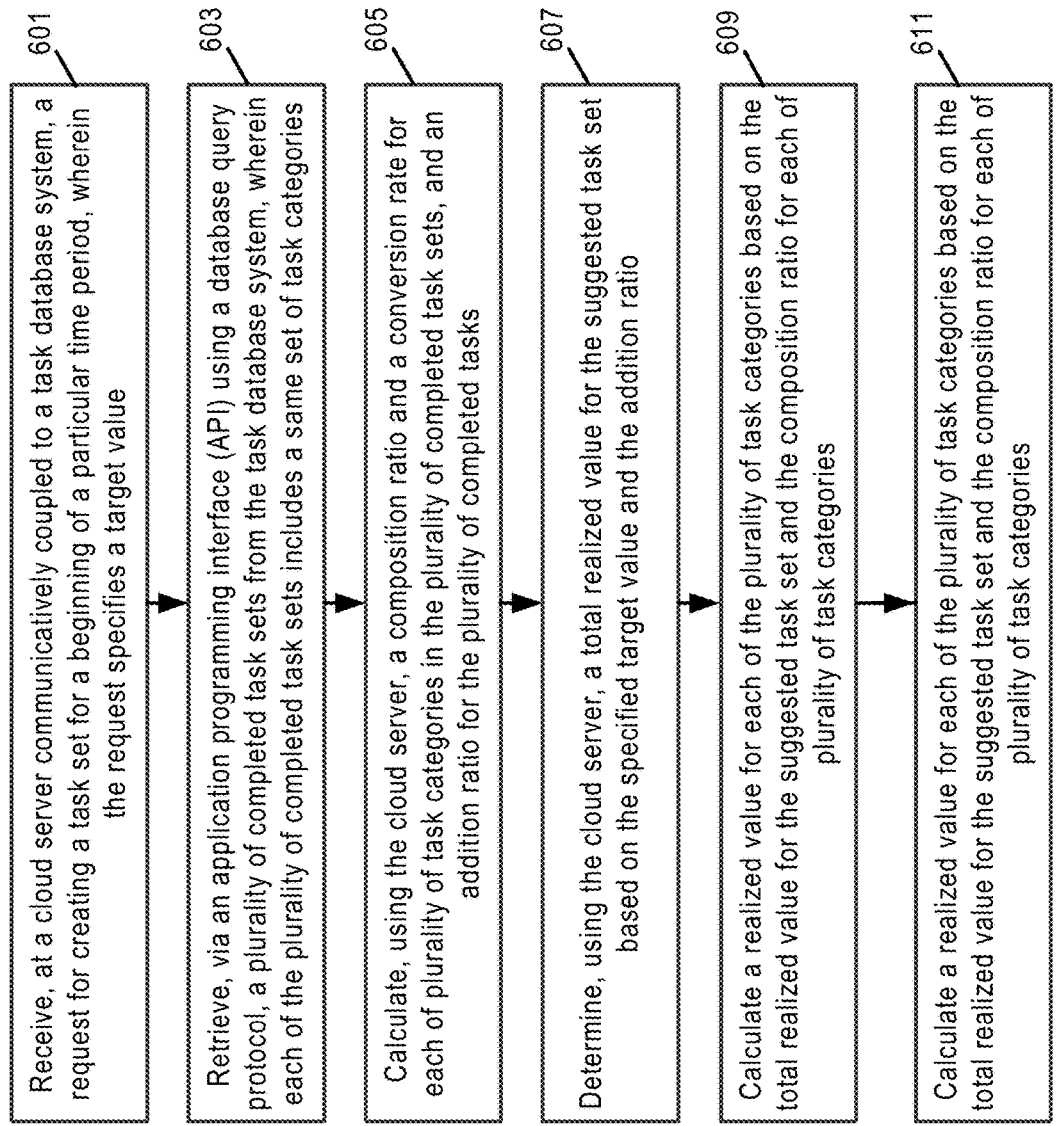
FIG. 6 illustrates a process for creating a suggest task set to meet a predetermined target value in accordance with an embodiment of the invention.

FIG. 6 illustrates a process for creating a suggest task set to meet a predetermined target value in accordance with an embodiment of the invention. As shown in FIG. 6, the process may be performed by process logic that includes software, hardware, or a combination thereof. For example, the process may be performed by the task set creation module/server 119 and one or more other modules in the cloud server 111.

Referring to FIG. 6, in operation 601, a cloud server having a memory and a processor over a network receives a request creating a task set for a beginning of a particular time period, and the request specifies a target value. In operation 603, in response to the request, the cloud server retrieves, via an application programming interface (API) using a database query protocol, a number of completed task sets from the task database system, wherein each of the plurality of completed task sets includes a same set of task categories. In operation 605, the cloud server calculates, using the cloud server, a composition ratio and a conversion rate for each of plurality of task categories in the plurality of completed task sets, and an addition ratio for the plurality of completed tasks. In operation 607, the cloud server determines, using the cloud server, a total realized value for the suggested task set based on the specified target value and the addition ratio. In operation 609, the cloud server calculates a realized value for each of the plurality of task categories based on the total realized value for the suggested task set and the composition ratio for each of plurality of task categories. In operation 611, the cloud server constructs, using the cloud server, the suggested task set with the plurality of task categories based on the conversion rate for each of the plurality of task categories and the realized value for that task category.

Figure 7:
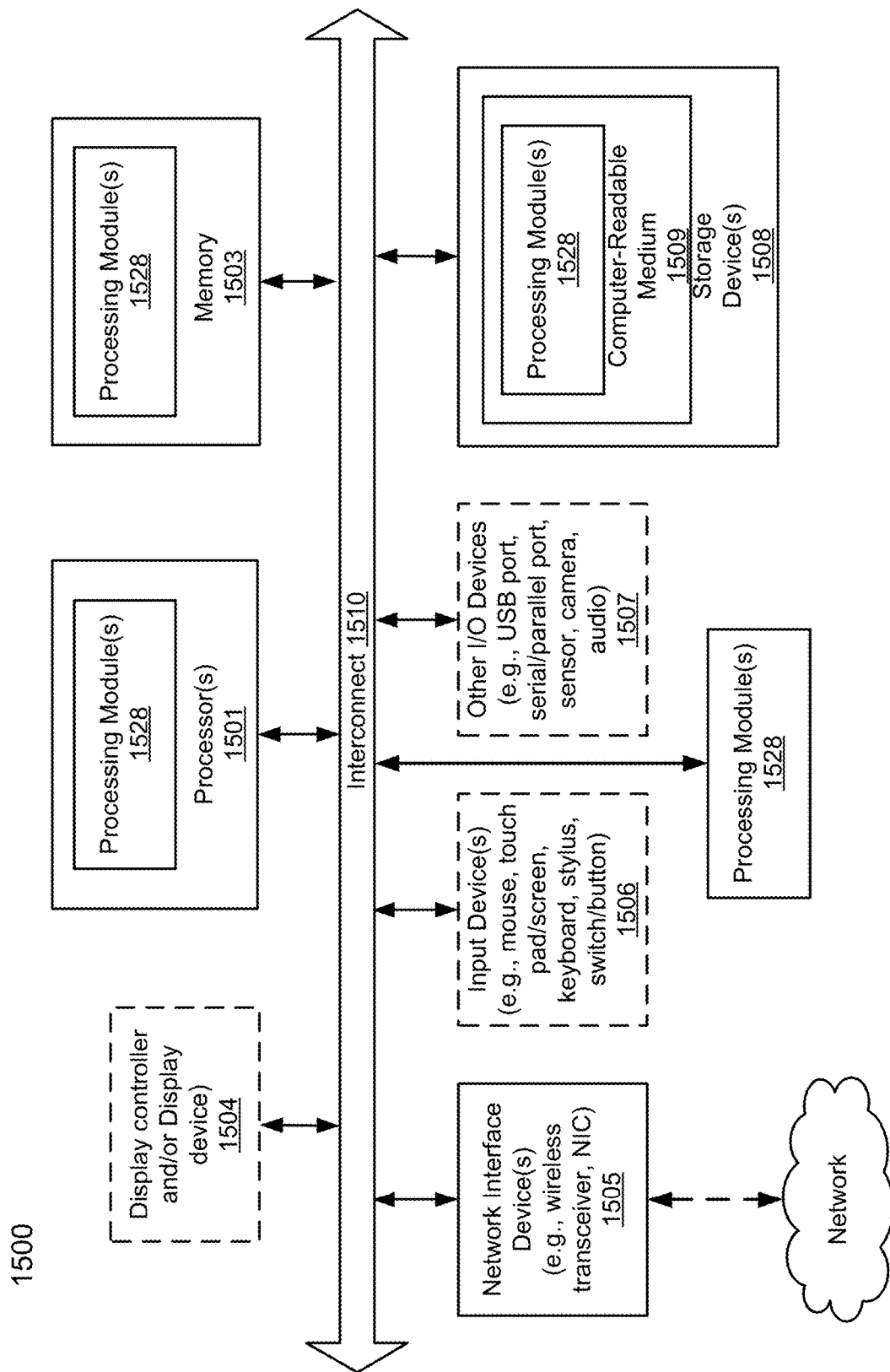
FIG. 7 is a block diagram illustrating an example of a data processing system which may be used with one or more embodiments of the invention.

FIG. 7 is a block diagram illustrating an example of a data processing system which may be used with one or more embodiments of the invention. For example, system 1500 may represent any of data processing systems described above performing any of the processes of methods described above, such as, for example, client devices 101-102 and servers 105-107 and 111 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, task manager 110, activity manager 120, and/or data synchronization module 212 of FIGS. 1A-1B and 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
receiving, at a cloud server having a hardware processor and memory, a request from a client device for a suggested task set at a beginning of a particular time period, wherein the request specifies a target value, wherein the suggested task set is associated with a set of task categories;
in response to the request, retrieving, via an application programming interface (API) using a database query protocol, a plurality of completed task sets from a task database system over a network;
calculating, at the cloud server, a composition ratio and a conversion rate for each of the set of task categories in the plurality of completed task sets;
calculating an addition ratio for each of the plurality of completed task sets;
calculating an average composition ratio and an average conversion rate for each task category of the set of task categories across the plurality of completed task sets, and an average addition ratio for the plurality of completed task sets;

determining, at the cloud server, a suggested total realized value for the suggested task set in view of the specified target value and the average addition ratio;

calculating a suggested realized value for each of the set of task categories in the suggested task set based on the suggested total realized value for the suggested task set and the average composition ratio for the task category across the plurality of completed task sets;

calculating a suggested nominal value for each of the set of task categories in the suggested task set based on the suggested realized value for the task category and the average conversion rate for the task category across the plurality of completed task sets;

generating, at the cloud server, the suggested task set with the set of task categories based on their suggested nominal values; and transmitting, from the cloud server, the suggested task set to the client device over the network to be presented at the client device, wherein the suggested task set is displayed by a graphical representation in a graphical user interface at the client device, wherein a window is opened in response to user input to display a current nominal value and the corresponding suggested nominal value in real time for each of the sets of task categories in the suggested task set, and wherein the current nominal value for a task category of the set of task categories is presented at the client device in a predetermined color, when the current suggested nominal value is less than a corresponding suggested nominal value by a predetermined amount.

2. The method of claim 1, wherein each of the plurality of completed task sets is associated with a same set of task categories as the set of task categories in the suggested task set.

3. The method of claim 1, wherein each of the plurality of completed task sets was constructed and completed in one of a plurality of predetermined time periods, each of the predetermined time periods matching the particular time period in length.

4. The method of claim 1, wherein the composition ratio for each task category represents a ratio of a realized value for the task category in a completed task set over a total realized value of the completed task averaged across the plurality of completed task sets.

5. The method of claim 1, wherein the conversion rate for each task category represents a ratio of a realized value for the task category in a completed task sets over a nominal value for the task category in the completed task set averaged across the plurality of completed task sets.

6. The method of claim 1, wherein the addition ratio represents an average ratio at which a realized value of a completed task set increases over time.

7. The method of claim 1, wherein the set of task categories in the suggested task set and in each of the plurality of completed task sets represent different stages of processing in a life cycle of a task.

8. The method of claim 7, wherein the different stages of processing include closed, commit, upside, pipeline, not include, and new.

9. The method of claim 1, wherein the target value represents a value that each of tasks in the suggested task set is expected to reach by an end of the particular time period.

10. The method of claim 1, wherein the particular time period represents a particular quarter of a year.

11. The method of claim 1, wherein the current nominal value for a task category of the set of task categories is presented at the client device in a predetermined color, when the current suggested nominal value is less than a corresponding suggested nominal value by a predetermined amount.

12. A non-transitory machine-readable medium having instructions stored therein, which when executed by a processor, cause the processor to perform operations, the operations comprising:

receiving a request from a client device for a suggested task set at a beginning of a particular time period, wherein the request specifies a target value, wherein the suggested task set is associated with a set of task categories;

in response to the request, retrieving, via an application programming interface (API) using a database query protocol, a plurality of completed task sets from a task database system over a network;

calculating a composition ratio and a conversion rate for each of the set of task categories in the plurality of completed task sets;

calculating an addition ratio for each of the plurality of completed task sets;

calculating an average composition ratio and an average conversion rate for each task category of the set of task categories across the plurality of completed task sets, and an average addition ratio for the plurality of completed task sets;

determining a suggested total realized value for the suggested task set in view of the specified target value and the average addition ratio;

calculating a suggested realized value for each of the set of task categories in the suggested task set based on the suggested total realized value for the suggested task set and the average composition ratio for the task category across the plurality of completed task sets;

calculating a suggested nominal value for each of the set of task categories in the suggested task set based on the suggested realized value for the task category and the average conversion rate for the task category across the plurality of completed task sets;

generating the suggested task set with the set of task categories based on their suggested nominal values; and transmitting the suggested task set to the client device over the network to be presented at the client device, wherein the suggested task set is displayed by a graphical representation in a graphical user interface at the client device, wherein a window is opened in response to user input to display a current nominal value and the corresponding suggested nominal value in real time for each of the sets of task categories in the suggested task set, and wherein the current nominal value for a task category of the set of task categories is presented at the client device in a predetermined color, when the current suggested nominal value is less than a corresponding suggested nominal value by a predetermined amount.

13. The machine-readable medium of claim 12, wherein each of the plurality of completed task sets is associated with a same set of task categories as the set of task categories in the suggested task set.

14. The machine-readable medium of claim 12, wherein each of the plurality of completed task sets was constructed and completed in one of a plurality of predetermined time periods, each of the predetermined time periods matching the particular time period in length.

15. The machine-readable medium of claim 12, wherein the composition ratio for each task category represents a ratio of a realized value for the task category in a completed task set over a total realized value of the completed task averaged across the plurality of completed task sets.

16. The machine-readable medium of claim 12, wherein the conversion rate for each task category represents a ratio of a realized value for the task category in a completed task sets over a nominal value for the task category in the completed task set averaged across the plurality of completed task sets.

17. The machine-readable medium of claim 12, wherein the addition ratio represents an average ratio at which a realized value of a completed task set increases over time.

18. The machine-readable medium of claim 12, wherein the set of task categories in the suggested task set and in each of the plurality of completed task sets represent different stages of processing in a life cycle of a task.

19. A data processing system, comprising:
a processor; and
a memory coupled to the processor to store instructions, which when executed by the processor, cause the processor to perform operations, the operations comprising:
receiving a request from a client device for a suggested task set at a beginning of a particular time period, wherein the request specifies a target value, wherein the suggested task set is associated with a set of task categories;
in response to the request, retrieving, via an application programming interface (API) using a database query protocol, a plurality of completed task sets from a task database system over a network;
calculating a composition ratio and a conversion rate for each of the set of task categories in the plurality of completed task sets;
calculating an addition ratio for each of the plurality of completed task sets;
calculating an average composition ratio and an average conversion rate for each task category of the set of task categories across the plurality of completed task sets, and an average addition ratio for the plurality of completed task sets;
determining a suggested total realized value for the suggested task set in view of the specified target value and the average addition ratio;
calculating a suggested realized value for each of the set of task categories in the suggested task set based on the suggested total realized value for the suggested task set and the average composition ratio for the task category across the plurality of completed task sets;
calculating a suggested nominal value for each of the set of task categories in the suggested task set based on the suggested realized value for the task category and the average conversion rate for the task category across the plurality of completed task sets;
generating the suggested task set with the set of task categories based on their suggested nominal values; and
transmitting the suggested task set to the client device over the network to be presented at the client device, wherein the suggested task set is displayed by a graphical representation in a graphical user interface at the client device, wherein a window is opened in response to user input to display a current nominal value and the corresponding suggested nominal value in real time for each of the sets of task categories in the suggested task set, and wherein the current nominal value for a task category of the set of task categories is presented at the client device in a predetermined color, when the current suggested nominal value is less than a corresponding suggested nominal value by a predetermined amount.

* * * * *